United States Patent
Hsiao et al.

(10) Patent No.: US 9,081,551 B2
(45) Date of Patent: Jul. 14, 2015

(54) CASING STRUCTURE AND ELECTRONIC DEVICE

(71) Applicants: Lite-On Electronics (Guangzhou) Limited, Guangzhou (CN); Lite-On Technology Corporation, Taipei (TW)

(72) Inventors: Hsu-Chih Hsiao, New Taipei (TW); Yue-Wen Jiang, Cia-I Hsien (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 308 days.

(21) Appl. No.: 13/843,826

(22) Filed: Mar. 15, 2013

(65) Prior Publication Data
US 2014/0168868 A1 Jun. 19, 2014

(30) Foreign Application Priority Data
Dec. 17, 2012 (CN) .......................... 2012 1 0548847

(51) Int. Cl.
*H05K 5/00* (2006.01)
*H05K 1/14* (2006.01)
*G06F 1/18* (2006.01)

(52) U.S. Cl.
CPC .............. *G06F 1/188* (2013.01); *G06F 1/181* (2013.01); *G06F 1/184* (2013.01)

(58) Field of Classification Search
CPC ....... H05K 7/142; H05K 3/368; H05K 1/141; H05K 1/144; H05K 7/1417; H05K 3/301; H05K 5/0256; H05K 3/306; G06F 1/184
See application file for complete search history.

(56) References Cited

U.S. PATENT DOCUMENTS

| 6,424,537 B1* | 7/2002 | Paquin et al. ................. 361/752 |
| 2003/0230616 A1* | 12/2003 | Kobayashi ..................... 225/93 |
| 2005/0198816 A1* | 9/2005 | Chao et al. ..................... 29/739 |
| 2007/0152697 A1* | 7/2007 | Hsu ................................ 324/765 |
| 2008/0169391 A1* | 7/2008 | Lin ............................. 248/205.1 |
| 2010/0259907 A1* | 10/2010 | Lo ................................. 361/759 |
| 2012/0081862 A1* | 4/2012 | Lin ............................... 361/748 |
| 2013/0258611 A1* | 10/2013 | Li et al. ......................... 361/748 |
| 2013/0279143 A1* | 10/2013 | Wang ............................ 361/818 |

FOREIGN PATENT DOCUMENTS

| TW | 547897 U | 8/2003 |
| TW | 200628050 A | 8/2006 |
| TW | M334219 U | 6/2008 |

* cited by examiner

*Primary Examiner* — Hoa C Nguyen
*Assistant Examiner* — Xanthia C Cunningham
(74) *Attorney, Agent, or Firm* — Li & Cai Intellectual Property (USA) Office

(57) ABSTRACT

A casing structure has an outer casing, a base plate, and a supporting unit. The base plate disposed inside the outer casing has an inner plate, an elastic arm, and a fixing body connected to the inner plate. The inner plate has a first plane and a second plane. The first plane is seamlessly abutted on the outer casing. One end of the elastic arm is angularly connected to the inner plate, and the other end of the elastic arm is defined as a free, and resiliently movable end. The fixing body is arranged correspondingly to the elastic arm. The supporting unit has a positioning body and a contacting body extended from the positioning body. The positioning body has a substantially frame shape, and the shape of the positioning body is matching to a space, which is surroundingly defined by the fixing body and the free end.

10 Claims, 17 Drawing Sheets

CASING STRUCTURE AND ELECTRONIC DEVICE

BACKGROUND OF THE INVENTION

1. Field of the Invention

The instant disclosure relates to a casing structure and an electronic device; more particular, to a casing structure and an electronic device each having an outer casing and an inner plate, in which the inner plate seamlessly abuts the outer casing.

2. Description of Related Art

Most of the conventional electronic device has a plurality of standoffs installed on a base plate thereof for carrying and fixing a mother board. However, since the standoffs are riveted on the base plate, the disassembling of the standoffs is difficult.

Thus, some manufacturers improve the problem, which is the disassembling of the standoff. Please refer to FIG. 1, the outer casing 1a and the base plate 2a are arranged with a gap G for enabling the standoff 3a to screw on the base plate 2a. However, the structure as shown in FIG. 1 needs to have the gap G between the outer casing 1a and the base plate 2a, thus, the thickness of the conventional electronic device cannot be reduced.

To achieve the abovementioned improvement, the inventors strive via industrial experience and academic research to present the instant disclosure, which can provide additional improvement as mentioned above.

SUMMARY OF THE INVENTION

One embodiment of the instant disclosure provides a casing structure and an electronic device capable of quick assembly and disassembly between the supporting unit and the base plate by a structure design where the base plate seamlessly abuts the outer casing. The casing structure comprises an outer casing, a base plate disposed in the outer casing, and a supporting unit including a substantially frame shaped positioning body and a contacting body, wherein the positioning body has a positioning portion and a connecting portion. The contacting body extends from the connecting portion of the positioning body. The second plane of the inner plate, the fixing body, and the free end of the elastic arm surroundingly define a restricting slot. The external contour and the size of the positioning body correspondingly conform to the restricting slot.

The base plate comprises an inner plate having a first plane and a second plane, are arranged to oppositely face each other, wherein the first plane substantially and seamlessly abuts an inner surface of the outer casing. An elastic arm projected in a sloped manner away from the inner plate and the outer casing, wherein one end of the elastic arm is angularly connected to the inner plate and the other end of the elastic arm is defined as a free end. The free end and a plane arranged on the inner plate are configured with a gap therebetween. A fixing body connected to the inner plate and correspondingly arranged to the elastic arm.

An electronic device comprises a casing structure and a power supply. The casing structure includes an outer casing, a base plate disposed in the outer casing, and a supporting unit including a substantially frame shaped positioning body and a contacting body, wherein the positioning body has a positioning portion and a connecting portion. The contacting body extends from the connecting portion of the positioning body. The second plane of the inner plate, the fixing body, and the free end of the elastic arm surroundingly define a restricting slot. The external contour and the size of the positioning body correspondingly conform to the restricting slot.

The base plate comprises an inner plate having a first plane and a second plane, are arranged to oppositely face each other, wherein the first plane substantially and seamlessly abuts an inner surface of the outer casing. An elastic arm projected in a sloped manner away from the inner plate and the outer casing, wherein one end of the elastic arm is angularly connected to the inner plate and the other end of the elastic arm is defined as a free end. The free end and a plane arranged on the inner plate are configured with a gap therebetween. A fixing body connected to the inner plate and correspondingly arranged to the elastic arm. The power supply is arranged in the outer casing and protrudingly disposed through the opening of the outer plate. The elastic arm and fixing body are arranged on a portion of the inner plate proximate to the orthographic projection of the power supply.

Base on the above, the casing structure and the electronic device are capable of quick assembly or disassembly between the supporting unit and the base plate by using the supporting unit to press the elastic arm of the base plate under the specific condition, which is the base plate seamlessly abutted on the outer casing.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

First Embodiment

Figure 1:
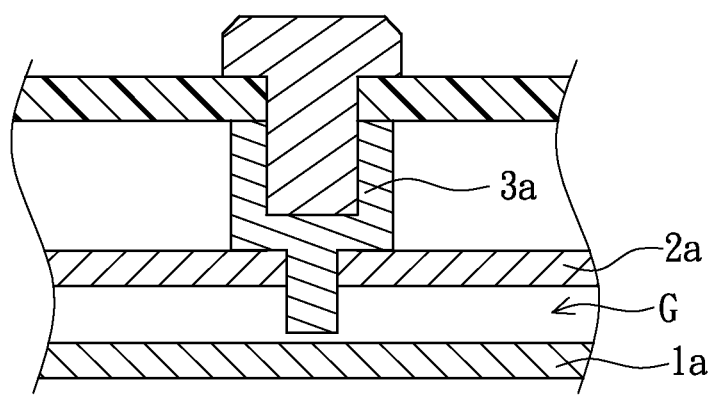
FIG. 1 is a partial cross-sectional view of a conventional electronic device.
Figure 2:
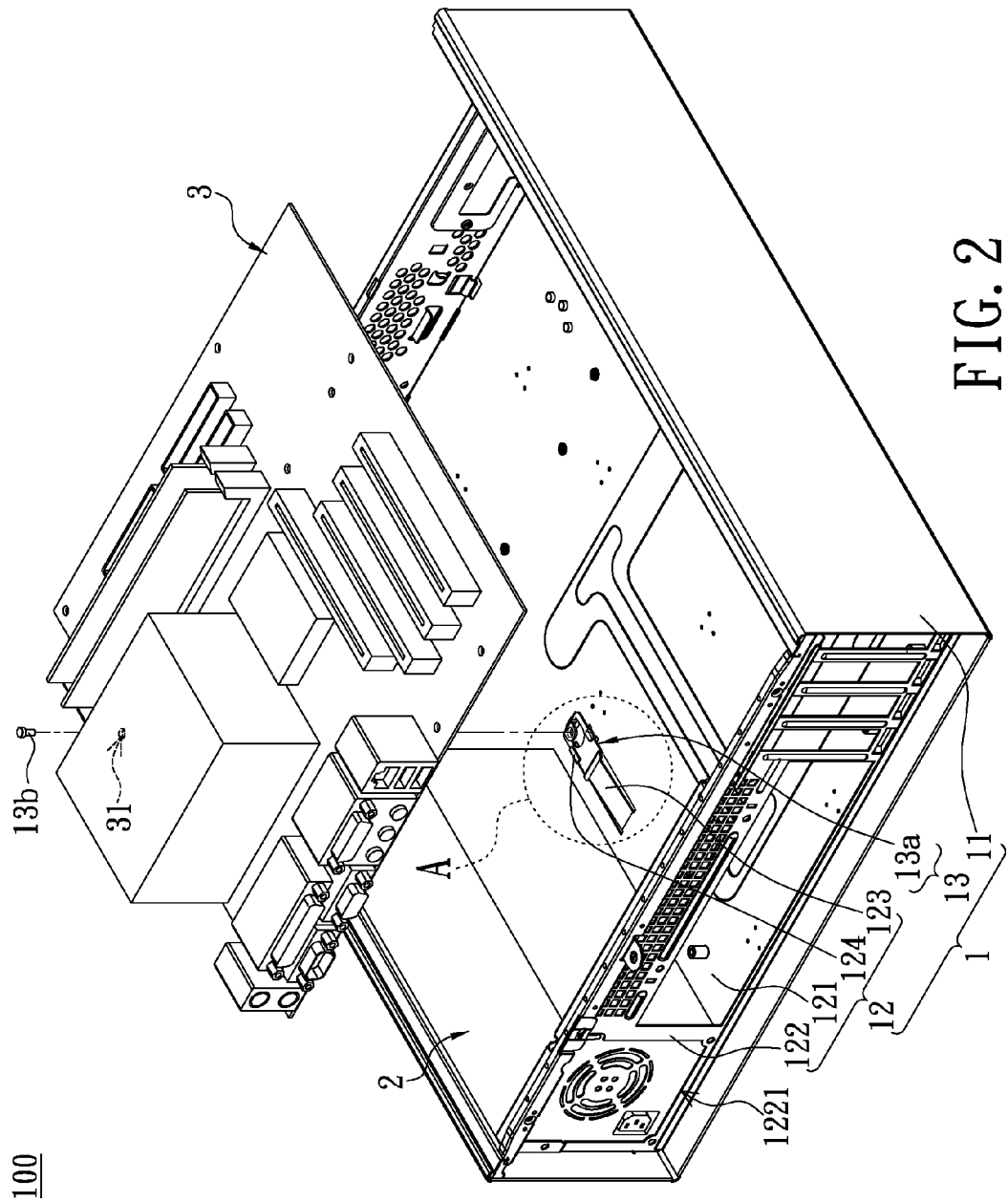
FIG. 2 is a perspective view showing a first embodiment of the electronic device according to the instant disclosure.

Please refer to FIG. 2, which shows a first embodiment of the instant disclosure. The embodiment provides an electronic device 100, such as a PC tower. The electronic device 100 has a casing structure 1, a power supply 2, and a mother board 3. The power supply 2 and the mother board 3 are installed in the casing structure 1.

Additionally, the electronic device 100 may further include other components such as a hard disk, a CD-ROM driver, or a transmission wire. The instant disclosure focuses on the casing structure 1, the power supply 2, and the mother board 3. Other components of the electronic device 100 are not disclosed in the instant embodiment.

The casing structure 1 has an outer casing 11, a base plate 12, and a supporting unit 13. The base plate 12 is disposed in the outer casing 11, and the supporting unit 13 is detachably installed on the base plate 12.

Specifically, the base plate 12 has an inner plate 121, an outer plate 122, an elastic arm 123, and three fixing bodies 124. The inner plate 121, the outer plate 122, the elastic arm 123, and the fixing bodies 124 in the instant embodiment are integrally formed by bending and punching a sheet metal, but not limited thereto. For example, the inner plate 121, the outer plate 122, the elastic arm 123, and the fixing bodies 124 can be joined together by welding.

Besides, the outer plate 122 and the inner plate 121 can be two separate components, in more detail, the outer plate 122 is substantially arranged perpendicular to the inner plate 121, but the outer plate 122 is not necessarily connected physically to the inner plate 121. That is to say, the outer plate 122 can be a part of the outer casing 11 or a separate component.

The outer plate 122 in the instant embodiment is extended substantially perpendicular from one edge of the inner plate 121. The outer plate 122 has portions defining an opening 1221 thereon, and the cross-section of the power supply 2 substantially defines the contour of the opening 1221.

As a result, the power supply 2 is arranged in the outer casing and protrudingly disposed through the opening 1221 of the outer plate 122, and the power supply 2 is fixed on the outer casing 11 by screwing.

Moreover, the elastic arm 123 and fixing bodies 124 are arranged on a portion of the inner plate 121 proximate to the orthographic projection of the power supply 2. The elastic arm 123 and the fixing bodies 124 are arranged proximate to an inside corner of the power supply 2, wherein the inside corner is away from the outer plate 122 and proximate to the inner plate 121.

Figure 3:
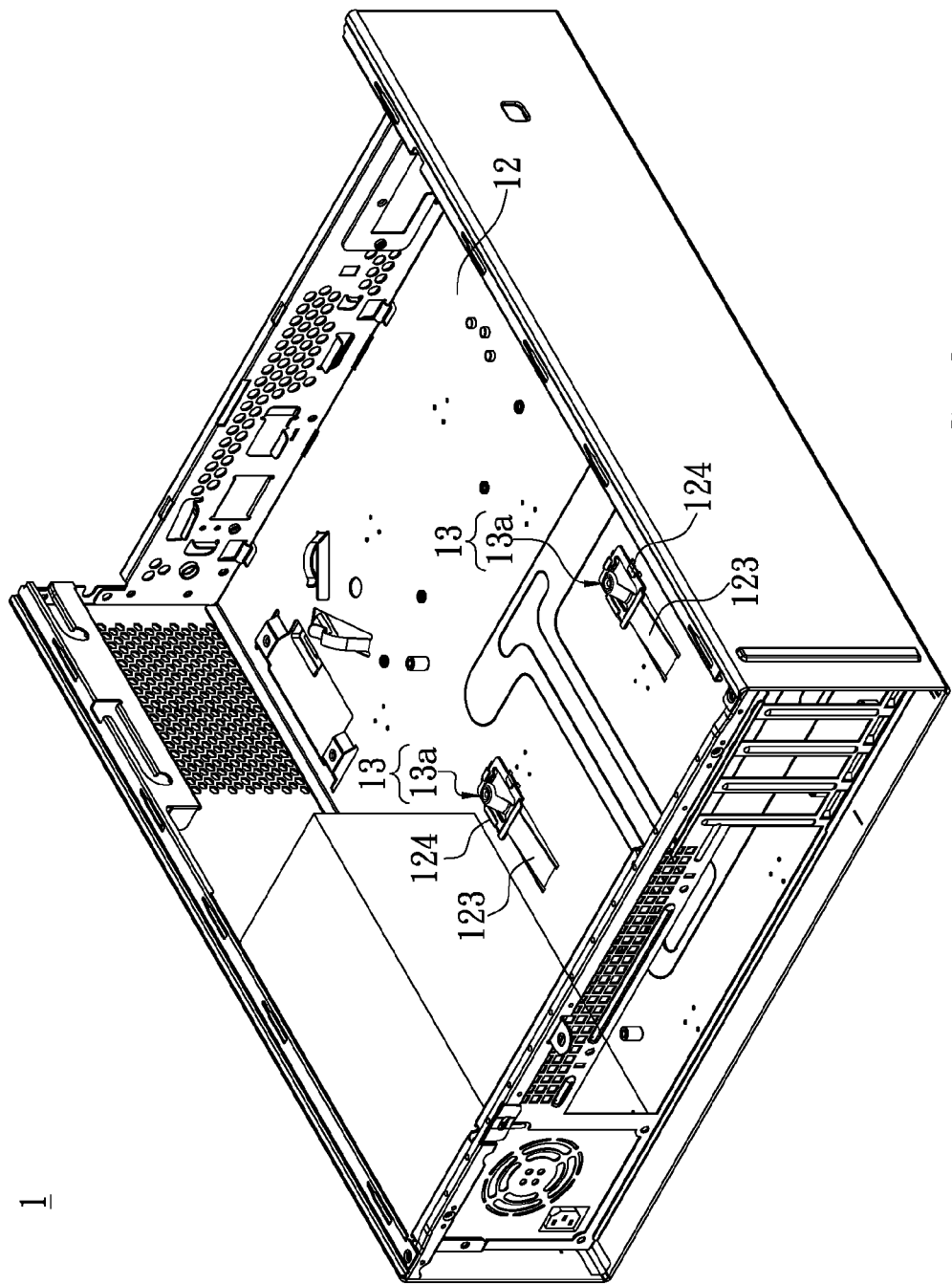
FIG. 3 is a perspective view showing another type of the casing structure of the first embodiment of the electronic device according to the instant disclosure.

The casing structure 1 in the instant embodiment illustrates a set of the elastic arm 123 and the corresponding fixing bodies 124 as an example. The base plate 12 may have a plurality of the elastic arms 123 and the corresponding fixing bodies 124 formed on the inner plate 121 such that the casing structure 1 may correspondingly have a plurality of the supporting units 13 (as shown in FIG. 3).

Figure 4:
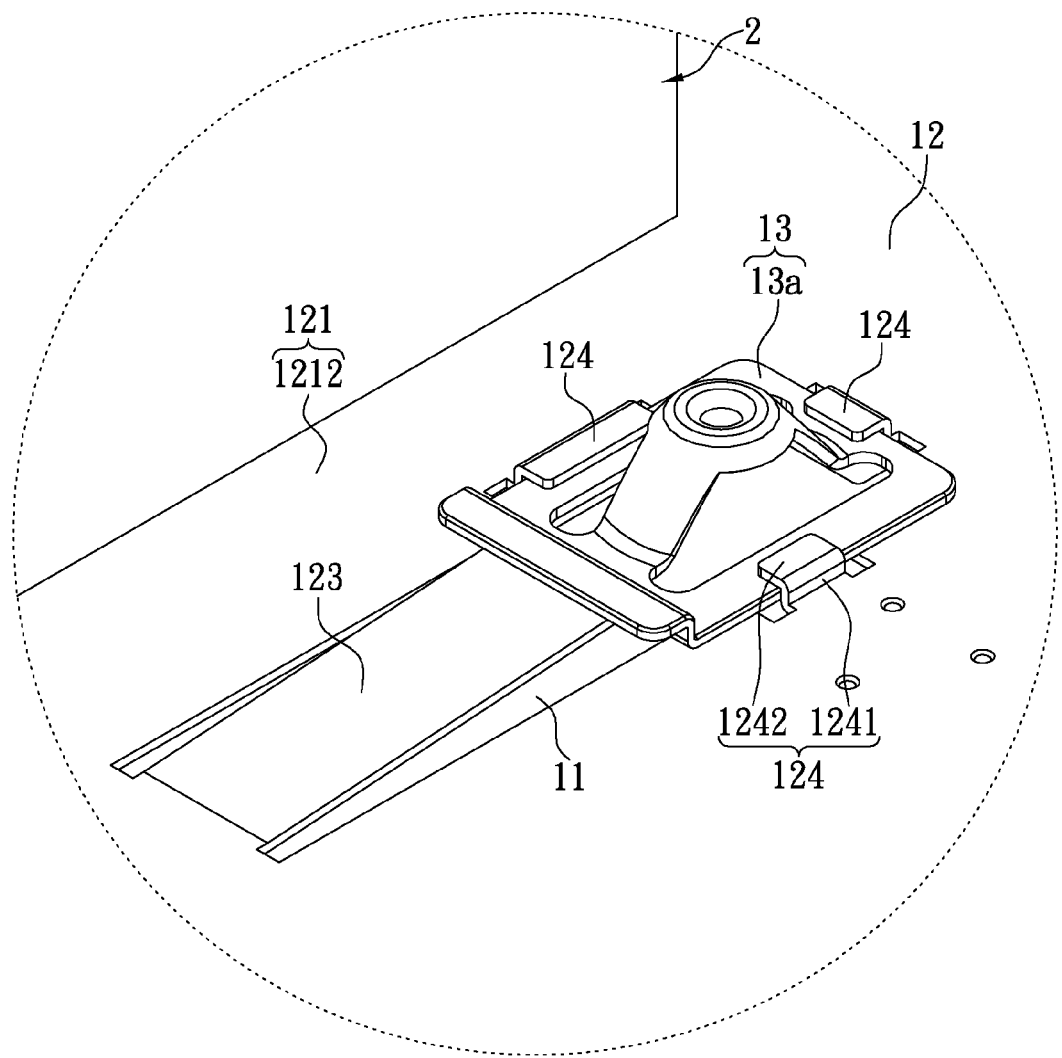
FIG. 4 is a partially enlarged view of the region "A" of FIG. 2.
Figure 5:
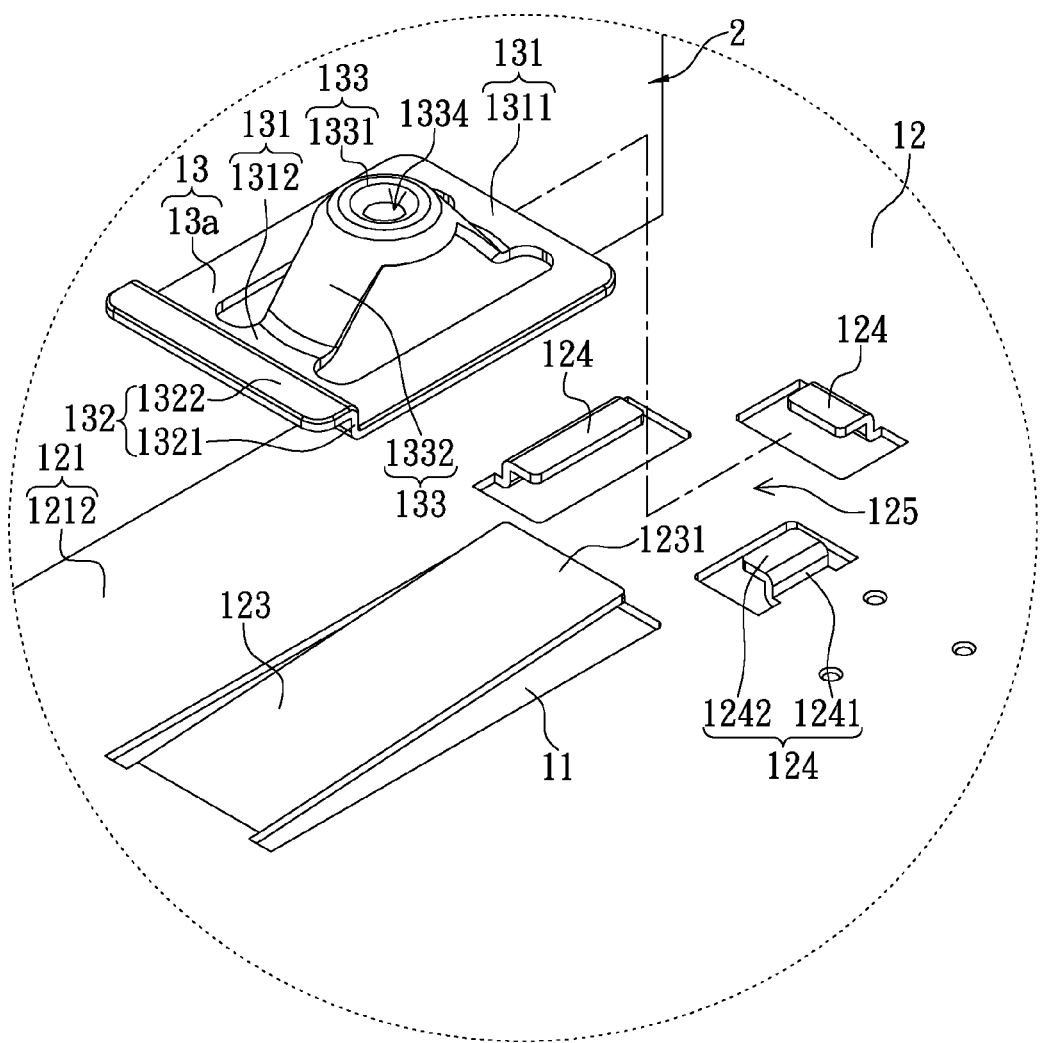
FIG. 5 is an exploded view of FIG. 4.
Figure 6:
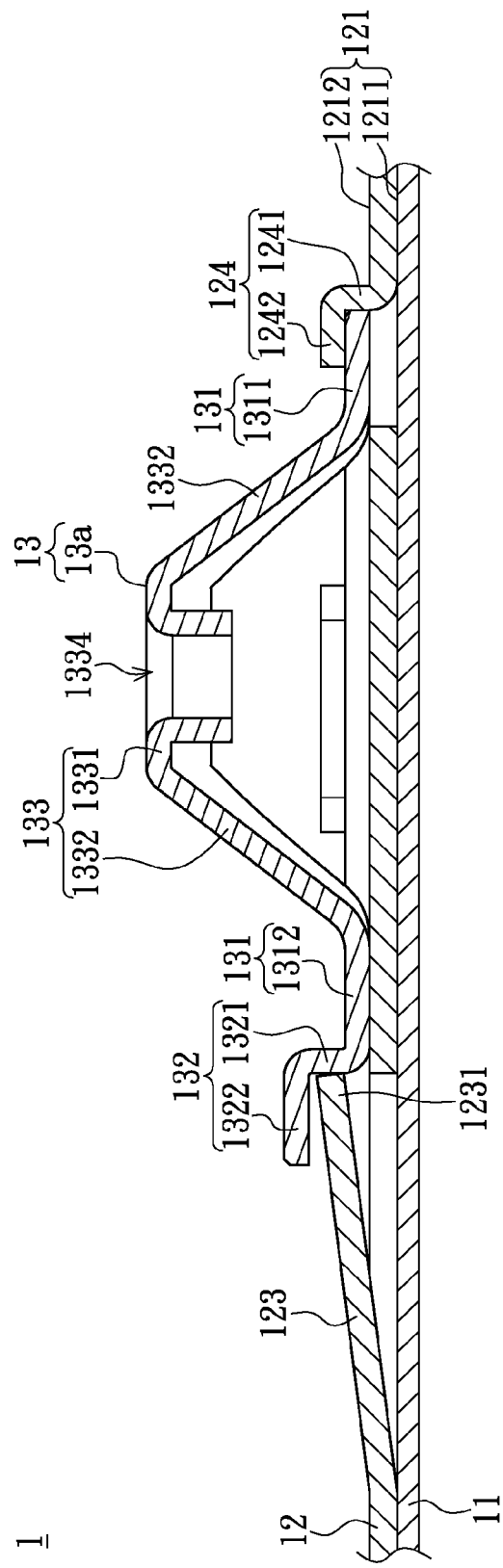
FIG. 6 is a cross-section view of FIG. 4.

Specifically, please refer to FIGS. 4 through 6. The inner plate 121 has a flat shape. The inner plate 121 has a first plane 1211 and a second plane 1212. The first plane 1211 and the second plane 1212 are arranged to oppositely face each other. The first plane 1211 of the inner plate 121 substantially and seamlessly abuts an inner surface of the outer casing 11.

The elastic arm 123 having an elongated shape is projected in a sloped manner away from the inner plate 121 and the outer casing 11. One end of the elastic arm 123 is angularly connected to the inner plate 121, and the other end of the elastic arm 123 is defined as a free and resiliently movable end 1231. The free end 1231 and a plane (e.g., the second plane 1212) arranged on the inner plate 121 are configured with a gap therebetween. The length of the elastic arm 123 can be adjusted according to the different resilience demands or different towers.

The cross-section of each contacting body 124 is substantially L-shaped, and each contacting body 124 has a transverse fixing portion 1241 and a longitudinal fixing portion 1242. One end of the transverse fixing portion 1241 is substantially and perpendicularly connected to the inner plate 121, and the other end of the transverse fixing portion 1241 is substantially and perpendicularly connected to the longitudinal fixing portion 1242. The longitudinal fixing portion 1242 is substantially configured parallel to the inner plate 121, and the longitudinal fixing portion 1242 is arranged with respective to the inner plate 121 with a pre-determined distance therebetween.

The fixing bodies 124 are correspondingly arranged to the elastic arm 123. Specifically, two of the fixing bodies 124 are conformingly arranged on two opposing lateral portions along the extension direction of the elastic arm 123 such that the end portions of the longitudinal fixing portions 1242 face towards one another. One of the fixing bodies 124 is arranged along the extension direction of the elastic arm 123, in which the end portion of the longitudinal fixing portion 1242 faces towards the elastic arm 123.

Moreover, the inner surfaces of the fixing bodies 124 and the free end 1231 of the elastic arm 123 surroundingly define a restricting slot 125 on portions of the second plane 1212 of the inner plate 121.

Figure 8:
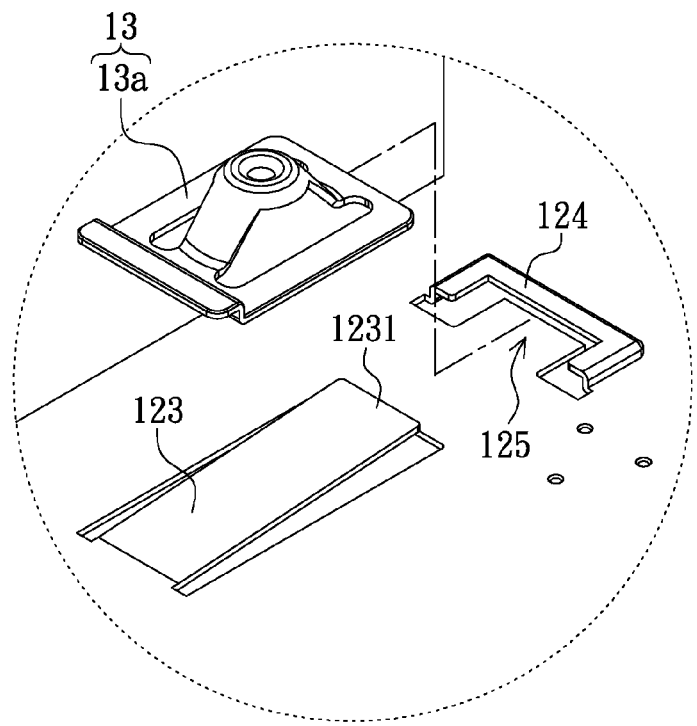
FIG. 8 is a perspective view showing the fixing body of the first embodiment of the electronic device according to the instant disclosure where the number of the fixing body is one.
Figure 9:
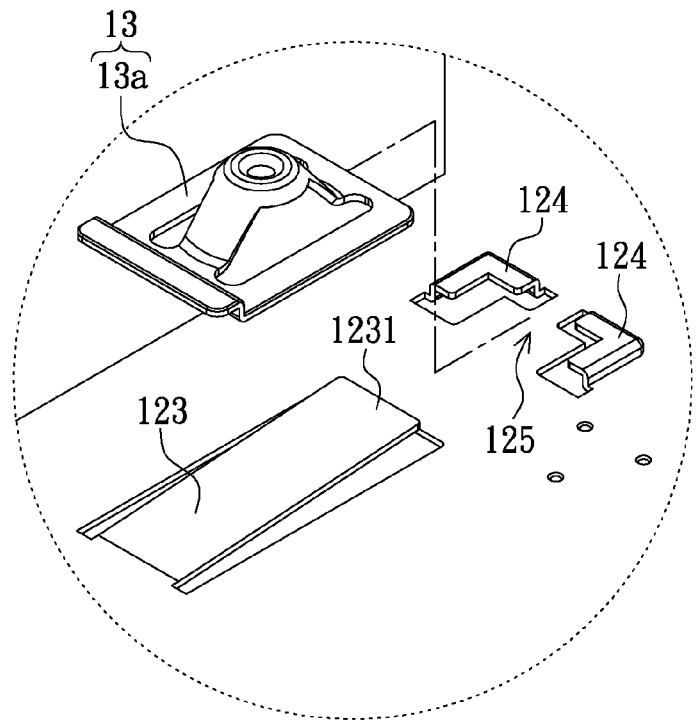
FIG. 9 is a perspective view showing the fixing body of the first embodiment of the electronic device of the instant disclosure where the number of the fixing body is two.
Figure 10:
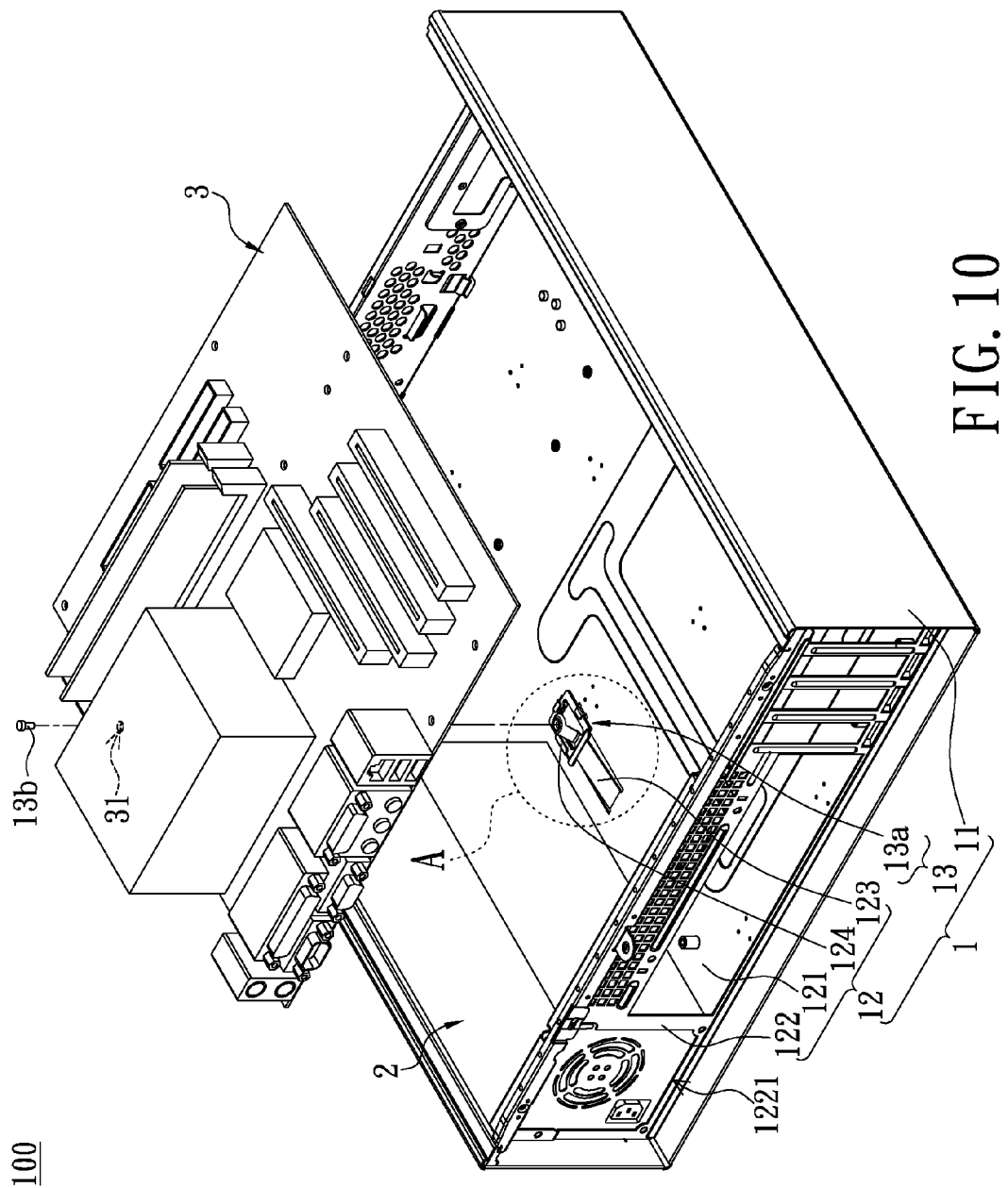
FIG. 10 is a perspective view showing a second embodiment of the electronic device according to the instant disclosure.
Figure 11:
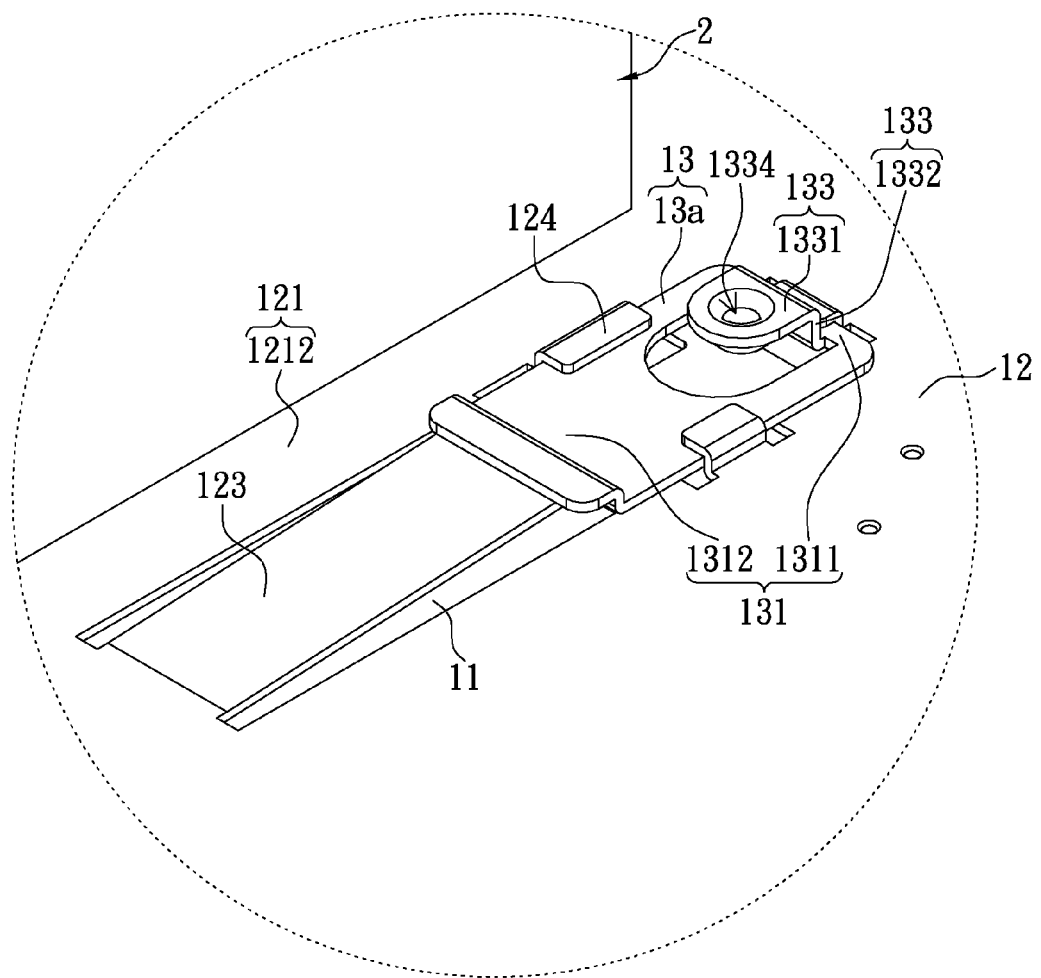
FIG. 11 is a partially enlarged view of the region "A" of FIG. 10.
Figure 12:
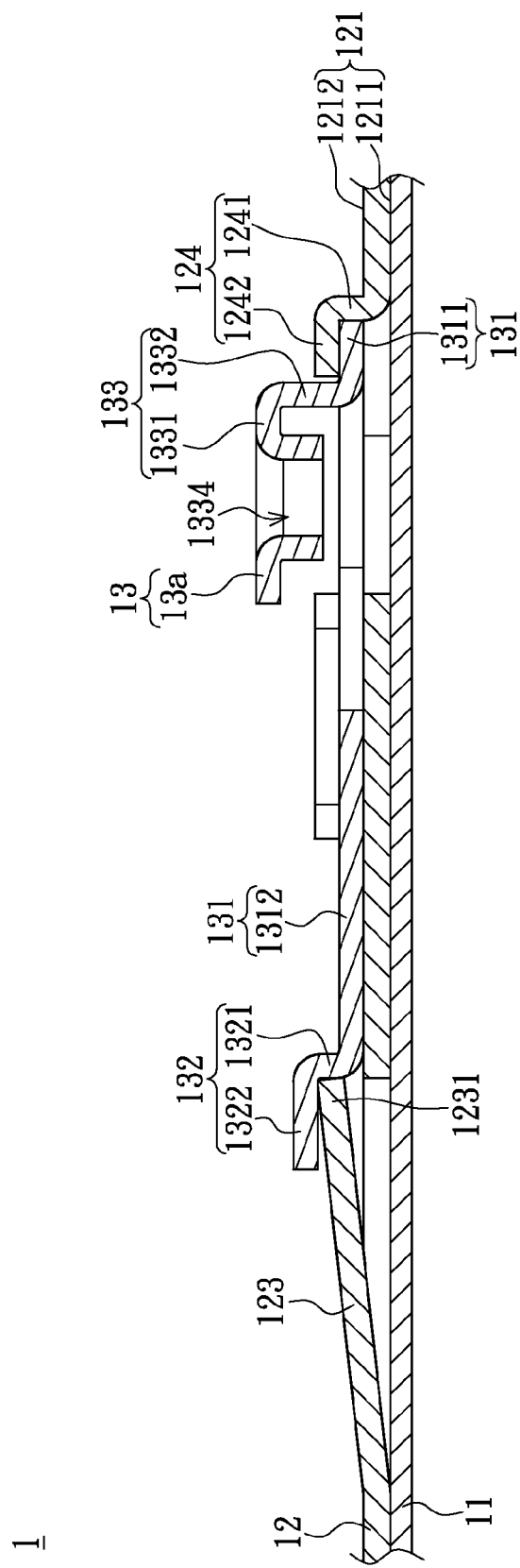
FIG. 12 is a cross-sectional view of FIG. 11.
Figure 13:
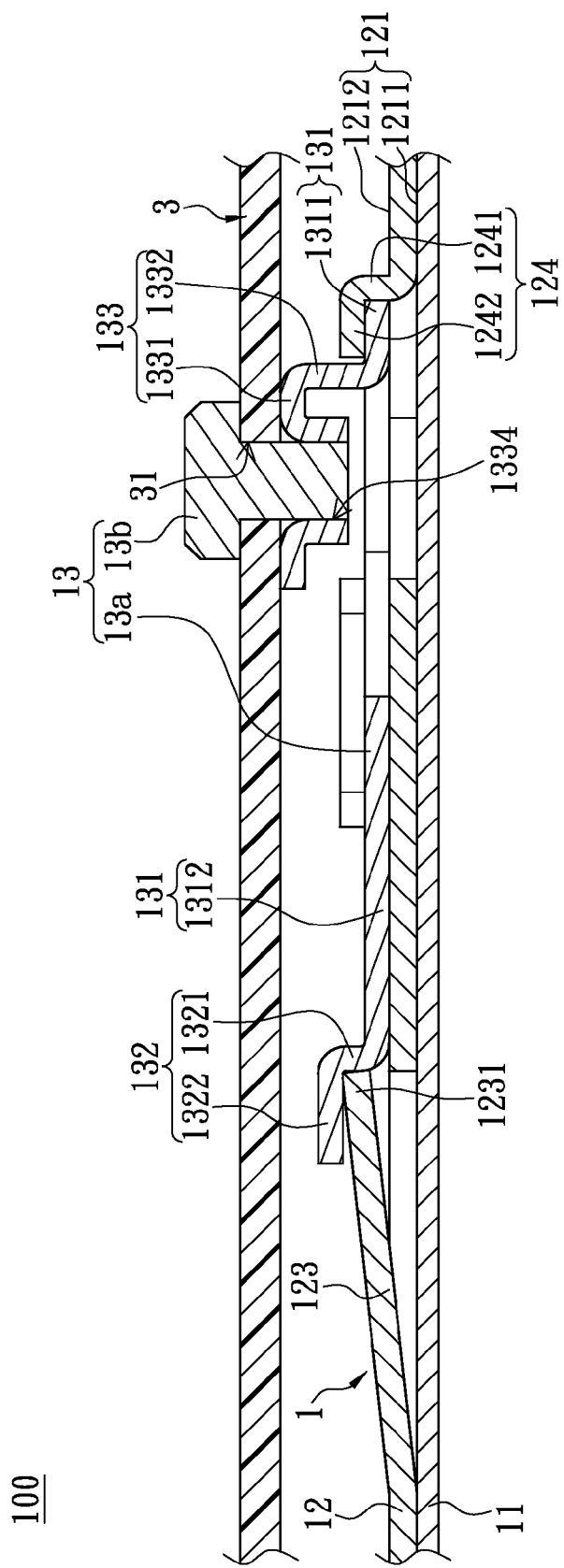
FIG. 13 is a partial cross-sectional view showing the second embodiment of the electronic device according the instant disclosure.
Figure 14:
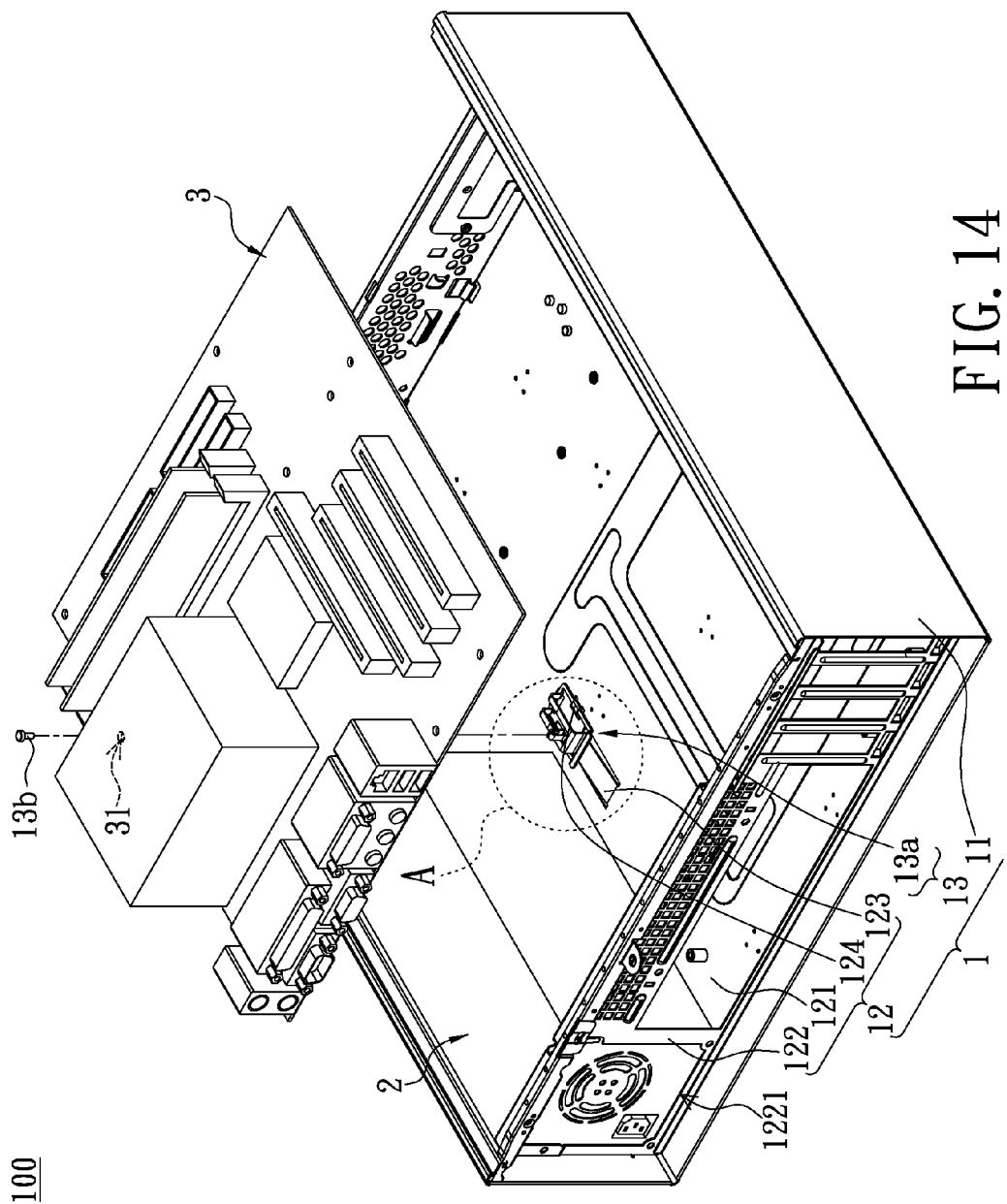
FIG. 14 is a perspective view showing a third embodiment of the electronic device according the instant disclosure.
Figure 15:
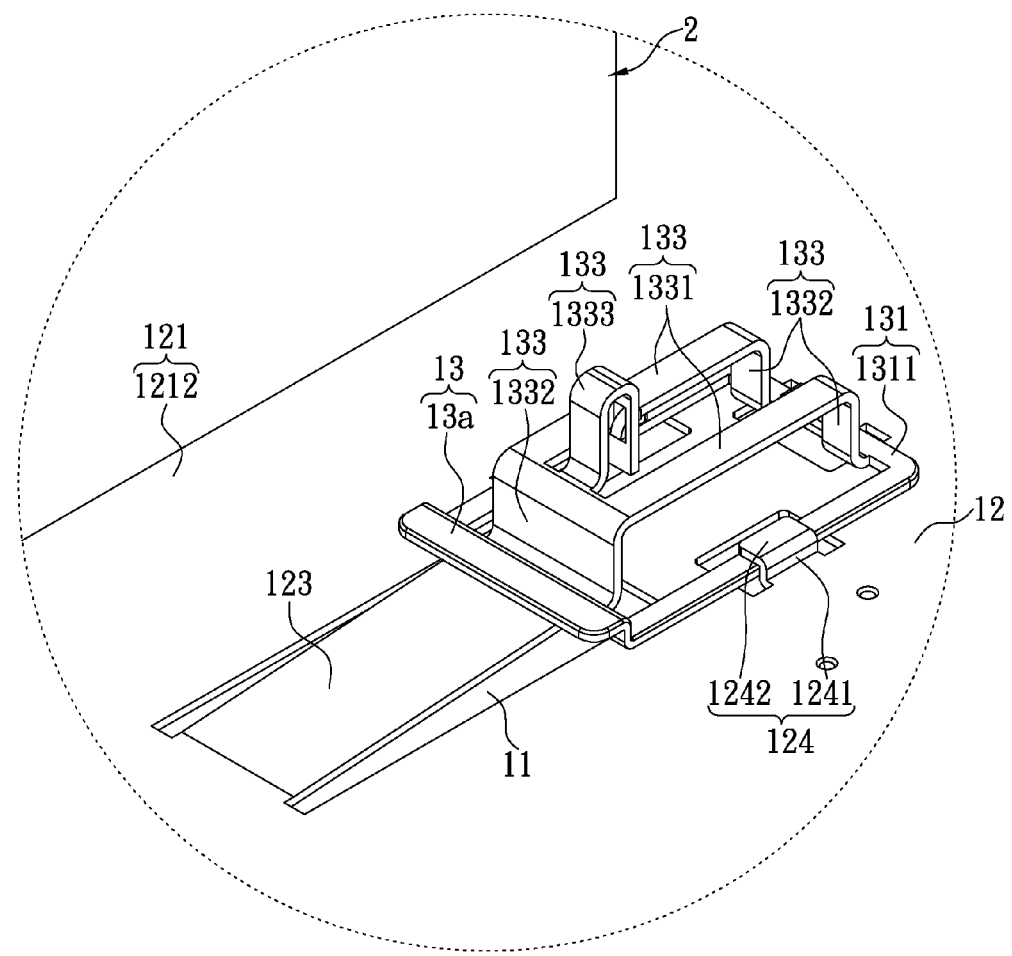
FIG. 15 is a partially enlarged view of the region "A" of FIG. 14.
Figure 16:
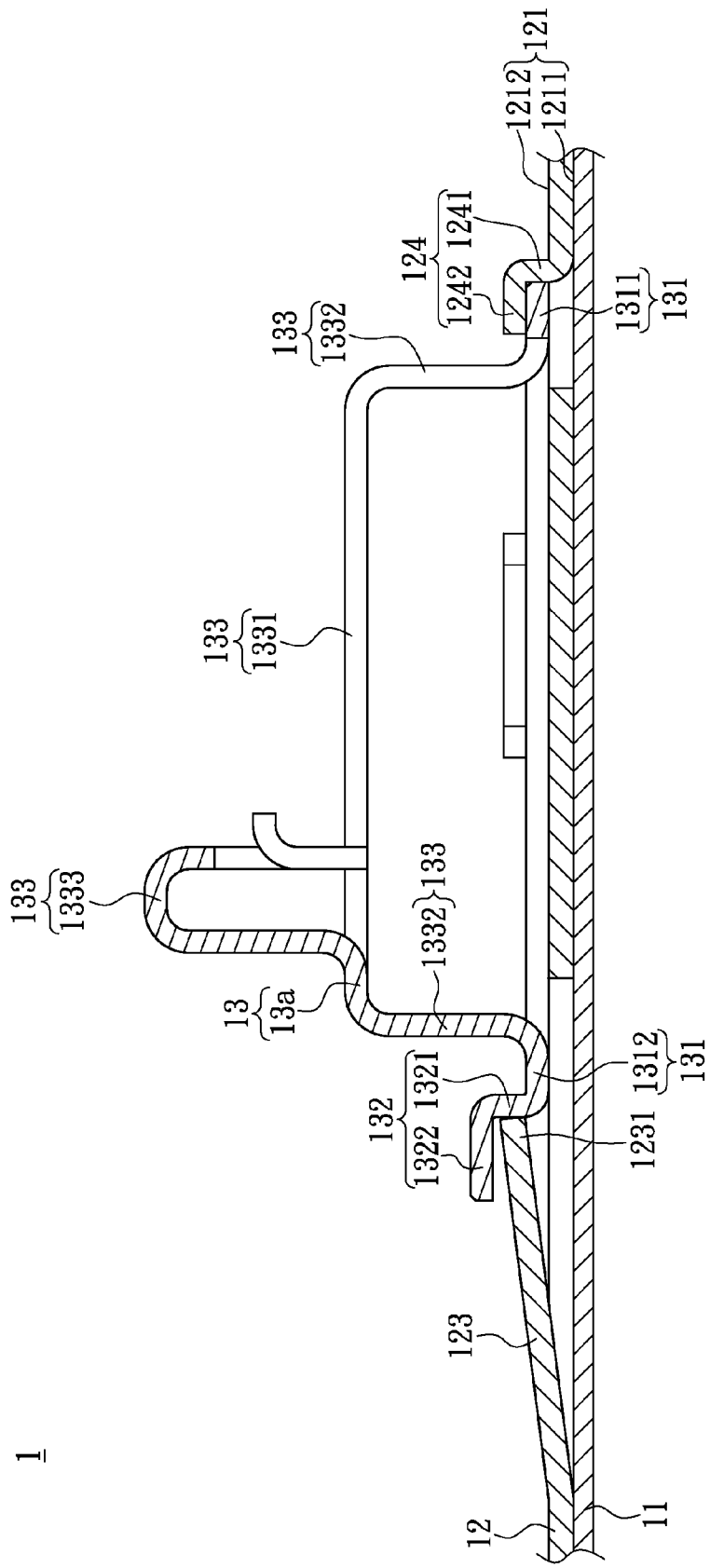
FIG. 16 is a cross-sectional view of FIG. 15.

Three fixing bodies 124 are applied as an example in the instant embodiment. The position or the shape of the fixing body 124 can be adjusted to reduce the number of fixing body 124. For example, with the base plate 12 having only one fixing body 124 (as shown in FIG. 8), the fixing body 124 is substantially U-shaped and has a U-shaped groove conforming to the elastic arm 123. Alternatively, the base plate 12 only includes two corners of the U-shaped fixing body 124 (as shown in FIG. 9) rendering only two fixing bodies 124.

The supporting unit 13 is suitable for pressing the elastic arm 123 to move the free end 1231 toward the outer casing 11, so that the supporting unit 13 is capacity of assembly or disassembly from the fixing bodies 124 and the free end 1231 of the elastic arm 123 along the second plane 1212 of the inner plate 121.

Figure 7:
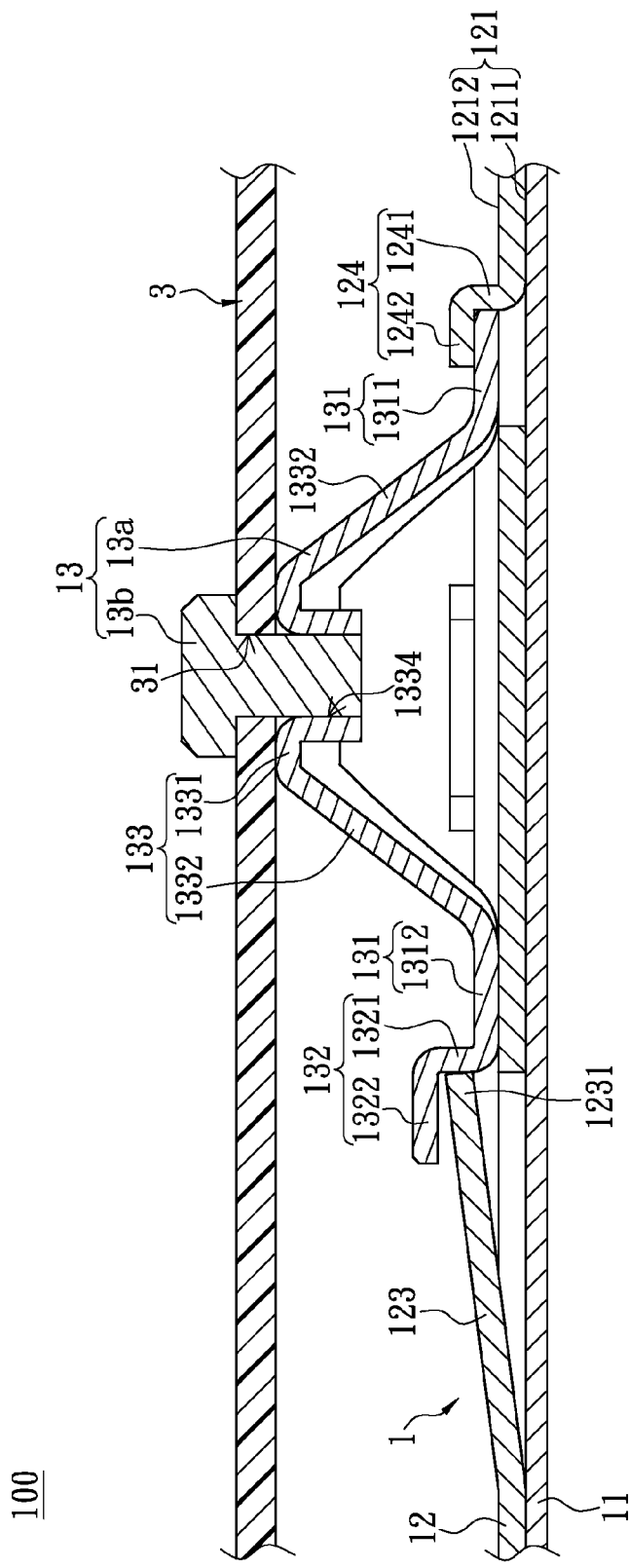
FIG. 7 is a partial cross-sectional view showing the first embodiment of the electronic device of the instant disclosure.

Specifically, the supporting unit 13 has a supporting piece 13a and a fixing piece 13b (as shown in FIG. 7). The supporting piece 13a in the instant embodiment is integrally formed by bending and punching a sheet metal. The fixing piece 13b in the instant embodiment is a screw for example. However, the fixing piece 13b can be other components having fixing means (e.g., R-shaped bolt).

The supporting piece 13a includes a positioning body 131 substantial having a frame shape, a contacting body 132, and a supporting body 133. The positioning body 131 has a flat annular shape, and the external contour and the size of the positioning body 131 conforms to shape of the second plane of the inner plate, the fixing body, and the free end of the elastic arm. Specifically, the positioning body 131 has a positioning portion 1311 and a connecting portion 1312. The positioning portion 1311 has an U-shape, and the connecting portion 1312 having an elongated shape is connected to the opposite ends of the positioning portion 1311.

The cross-section of the contacting body 132 is substantially L-shaped. The contacting body 132 has a contacting portion 1321 and a restricting portion 1322. The contacting portion 1321 perpendicularly extends to form the connecting portion 1312 of the positioning body 131, and the connecting portion 1312 perpendicularly extends to form the restricting portion 1322. The restricting portion 1322 is substantially parallel to the positioning body 131, and the restricting portion 1322 and the positioning body 131 are arranged with a pre-determined distance therebetween. An end portion of the restricting portion 1322 faces away from the positioning portion 1311. Specifically, the restricting portion 1322 is extended from the positioning body 131 with a predetermined height and the predetermined height in the instant embodiment is identical to the distance between the restricting portion 1322 and the plane (e.g., the second plane 1212) arranged on the inner plate 121. The predetermined height is slightly larger than the gap between the free end 1231 and the inner plate 121 such that the contacting body 132 can abut the free end 1231 of the elastic arm 123.

The supporting body 133 is extended from the annular inner edge of the positioning body 131, and the supporting body 133 has a carrying portion 1331 and a supporting portion 1332. In more detail, the supporting portion 1332 is substantially two plates in the instant embodiment, in which one end portion of the plates are integrally formed with the opposite sides of the annular inner edge of the positioning body 131, and the other end portion of the plates are integrally formed with the opposite sides of the carrying portion 1331 for retaining the relative positioning of the carrying portion 1331 and the positioning body 131. Moreover, portions proximate to the center portion of the carrying portion 1331 are inwardly formed with a thru hole 1334 (e.g., threaded hole) which is correspondingly conforming to fixing piece 13b.

As the supporting piece 13a is installed on the base plate 12, the positioning body 131 abuts the elastic arm 123 such that the elastic arm 123 and the second plane 1212 are arranged in the same plane. In other words, the positioning body 131 is disposed on the second plane 1212. Subsequently, the positioning body 131 is displaced towards the fixing bodies 124 such that the positioning portion 1311 abuts the inner surface of the fixing bodies 124. Successively, the elastic arm 123 may but not necessarily press against the positioning body 131 such that the elastic arm 123 returns to the original position and abuts the contacting portion 1321.

As the supporting piece 13a is installed on the base plate 12, the positioning body 131 is disposed in the restricting slot 125. The positioning portion 1311 is fixed between the fixing bodies 124 and the second plane 1212 of the inner plate 121, and the contacting body 132 abuts the free end 1231 of the elastic arm 123 such that the relative positioning of the supporting piece 13a and the base plate 12 is retained.

Specifically, the positioning portion 1311 of the positioning body 131 abuts the transverse fixing portions 1241, and the contacting portion 1321 of the contacting body 132 abuts the free end 1231 of the elastic arm 123 such that transverse movements of the supporting piece 13a is limited with respect to the second plane 1212.

Moreover, the positioning portion 1311 is fixed between the longitudinal fixing portions 1242 and the second plane 1212 of the inner plate 121 such that longitudinal movements of the supporting piece 13a is limited with respective to the second plane 1212.

As the supporting piece 13a is installed on the base plate 12, the height of the supporting body 133 with respective to the second plane 1212 of the inner plate 121 is greater than the height of the contacting body 132 with respective to the second plane 1212 of the inner plate 121, and the height of the supporting body 133 with respective to the second plane 1212 of the inner plate 121 is greater than the height of each fixing body 124 with respective to the second plane 1212 of the inner plate 121.

Please refer to FIG. 7, the mother board 3 has a plurality of thru holes 31 formed thereon. As the mother board 3 is installed on the casing structure 1, the mother board 3 is disposed on the carrying portion 1331 of the supporting piece 13a. One of the thru holes 31 of the mother board 3 is aligned with the thru hole 1334 of the carrying portion 1331. The fixing piece 13b inserts through the thru hole 31 of the mother board 3 and the thru hole 1334 of the carrying portion 1331 such that the mother board 3 is coupled between the fixing piece 13b and the carrying portion 1331 of the supporting piece 13a.

For disassembly of the supporting piece 13a from the base plate 12, the elastic arm 123 is pressed such that the elastic arm 123 and the second plane 1212 are arranged in the same plane. Subsequently, the supporting piece 13a is displaced along the second plane 1212 of the inner plate 121 opposite the assembly direction.

Thus, the casing structure 1 can provide quick assembly or disassembly between the supporting unit 13 and the base plate 12 by the design of the base plate 12 and the corresponding supporting piece 13a under the specific condition, which is the inner plate 121 seamlessly abuts the outer casing 11.

Second Embodiment

Please refer to FIGS. 10 through 14, which show a second embodiment of the instant disclosure. Since the instant embodiment is similar to the first embodiment, identical portions of the two embodiments are not disclosed again. The difference between the two embodiments is the supporting portion 1332 of the supporting body 133.

Specifically, the supporting portion 1332 is a sheet. The opposite end portions of the supporting portion 1332 are respectively connected to one end portion of the positioning portion 1311, which is the end portion away from the connecting portion 1312, and one end portion of the carrying portion 1331 for enabling the carrying portion 1331 to resiliently oscillate with respective to the positioning body 131.

Thus, the supporting force provided by the carrying portion 1331 of the supporting piece 13a in the instant embodiment is smaller than the first embodiment. That is to say, the instant embodiment is appropriate for conditions where the supporting piece 13a requires a relatively small supporting force.

Third Embodiment

Please refer to FIGS. 14 through 17, which show a third embodiment of the instant disclosure. The instant embodiment is similar to the above embodiments, so the identical portions of the embodiments are not disclosed again. The difference between the embodiments is the supporting unit 13. The supporting unit 13 of the instant embodiment only has a supporting piece 13a and the fixing piece 13b is not necessary.

Specifically, the supporting body 133 has two carrying portions 1331 not necessarily having thru hole 1334, two supporting portions 1332, and a wedged portion 1333. The carrying portions 1331 are separately arranged with a predetermined distance therebetween. Each supporting portion 1332 has a sheet shape, in which one end portion of the supporting portions 1332 are integrally formed with the opposite sides of the annular inner edge of the positioning body 131, and the other end portion of the supporting portions 1332 are integrally formed with the opposite sides of the carrying portion 1331. The wedged portion 1333 is arranged between the supporting portions 1332. One end of the wedged portion 1333 is connected to one of the supporting portions 1332 and the other end of the wedged portion 1333 is resiliently movable.

As the supporting piece 13a is installed on the base plate 12, the height of the wedged portion 1333 with respective to the second plane 1212 of the inner plate 121 is greater than the height of each carrying portion 1331 with respective to the second plane 1212 of the inner plate 121.

As the mother board 3 is installed on the casing structure 1, the mother board 3 is disposed on the carrying portions 1331 of the supporting piece 13a and the wedged portion 1333 is coupled to the thru hole 31 such that the mother board 3 is coupled between the carrying portions 1331 and the wedged portion 1333.

Thus, with the wedged portion 1333 of the supporting piece 13a formed, the mother board 3 can be installed on the casing structure 1 rather quickly, and with the wedged portion 1333 of the supporting piece 13a formed, the fixing piece 13b can be omitted.

Figure 17:
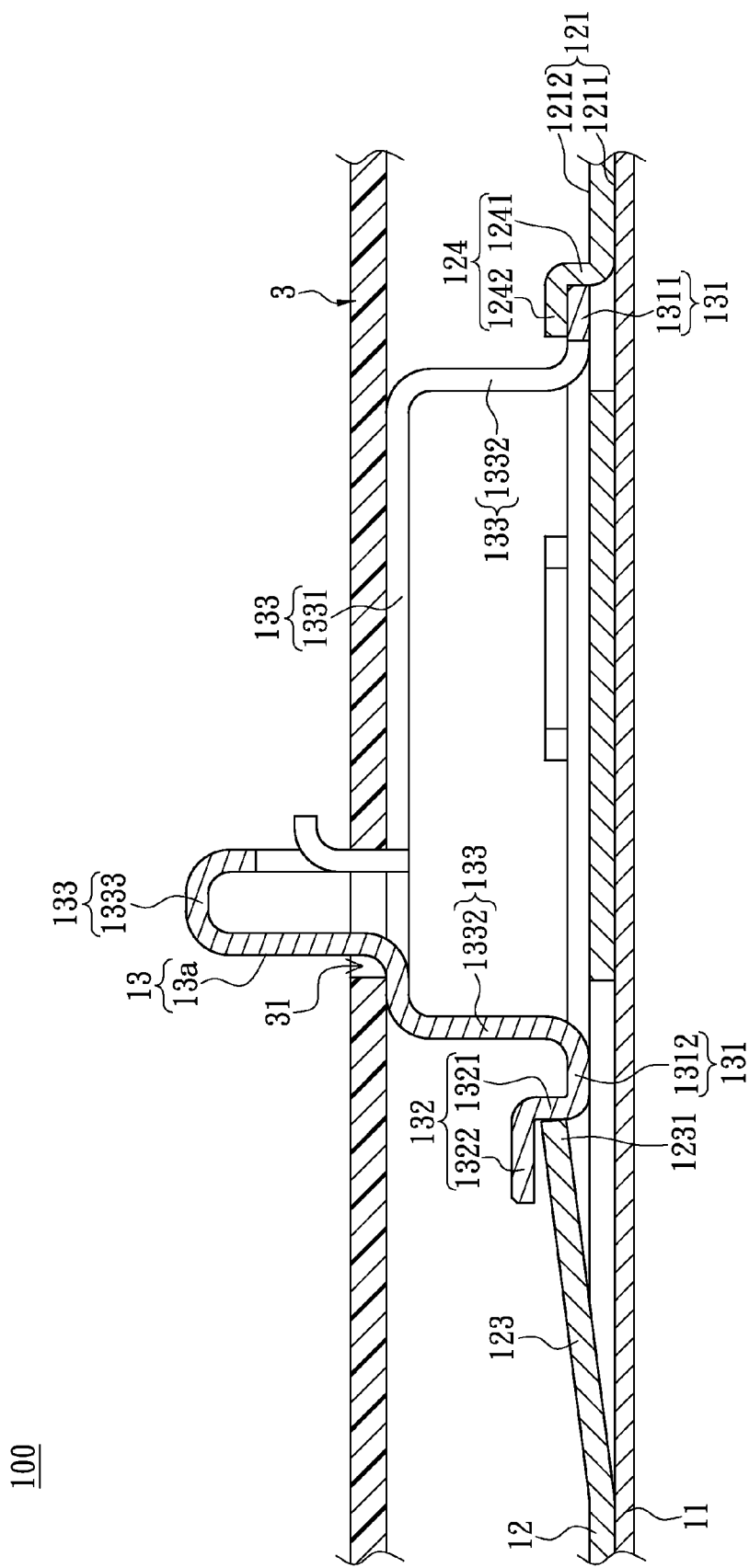
FIG. 17 is a partial cross-sectional view showing the third embodiment of the electronic device according the instant disclosure.
Figure 18:
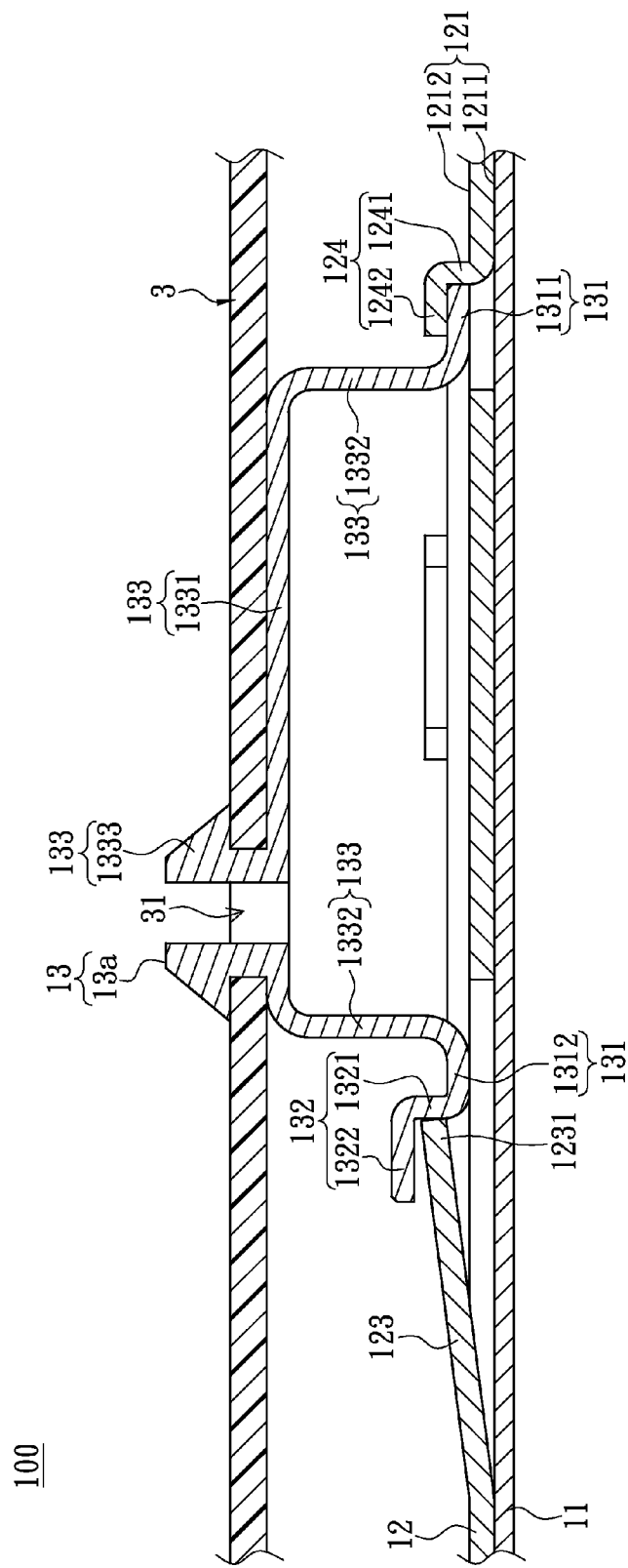
FIG. 18 is a cross-sectional view showing another type of the supporting unit of the third embodiment of the electronic device according to the instant disclosure.

Moreover, the wedged portion 1333 of the supporting piece 13a in the instant embodiment has the structure shown as the FIG. 17 for example. The structure of the wedged portion 1333 is not limited thereto inasmuch the wedged portion 1333 can couple the mother board 3 to the carrying portions 1331. For example, the wedged portion 1333 can be formed as shown in FIG. 18.

Base on the above, the electronic device can provide quick assembly or disassembly between the supporting unit and the base plate by pressing the supporting unit against the elastic arm of the base plate under the specific condition, which is the base plate seamlessly abuts the outer casing.

Moreover, the supporting unit can be used for different conditions by adjusting the structure of the supporting piece. For example, when the weight of an object disposed on the supporting piece is small, the connecting portion can be designed as a cantilever as mentioned in the description of the second embodiment. The fixing piece can be omitted as the supporting piece includes the wedged portion according to the description of the third embodiment.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A casing structure, comprising:
   an outer casing;
   a base plate disposed in the outer casing, the base plate comprising:
      an inner plate having a first plane and a second plane, are arranged to oppositely face each other, wherein the first plane substantially and seamlessly abuts an inner surface of the outer casing;
      an elastic arm projected in a sloped manner away from the inner plate and the outer casing, wherein one end of the elastic arm is angularly connected to the inner plate and the other end of the elastic arm is defined as a free end, the free end and a plane arranged on the inner plate are configured with a gap therebetween; and
      a fixing body connected to the inner plate and correspondingly arranged to the elastic arm; and
   a supporting unit including a substantially frame shaped positioning body and a contacting body, wherein the positioning body has a positioning portion and a connecting portion, the contacting body extends from the connecting portion of the positioning body;
   wherein the second plane of the inner plate, the fixing body, and the free end of the elastic arm surroundingly define a restricting slot, and the external contour and the size of the positioning body correspondingly conforms to the restricting slot.

2. The casing structure as claimed in claim 1, wherein the cross-sectional area of the contacting body is substantially L-shaped, the contacting body has a contacting portion perpendicularly extended from the positioning body with a predetermined height and a restricting portion perpendicularly extended from the contacting portion, and the predetermined height is slightly larger than the gap between the free end and the inner plate to provide contact between the contacting body and the free end of the elastic arm.

3. The casing structure as claimed in claim 1, wherein the positioning portion of the positioning body is fixed between the fixing body and the second plane of the inner plate, and the contacting body abuts the free end of the elastic arm for retaining the relative positioning of the supporting unit and the base plate.

4. The casing structure as claimed in claim 2, wherein the supporting unit has a supporting body extended from the positioning body, when the supporting unit is installed on the base plate, the height of the supporting body with respective to the second plane of the inner plate is greater than the height of the contacting body with respective to the second plane of the inner plate, and the height of the supporting body with respective to the second plane of the inner plate is greater than the height of the fixing body with respective to the second plane of the inner plate.

5. The casing structure as claimed in claim 4, wherein the supporting body has a carrying portion and a supporting portion, the supporting portion is integrally formed with the positioning body and two opposite ends of for maintaining the relative positioning of the carrying portion and the positioning body.

6. The casing structure as claimed in claim 4, wherein the supporting body has a carrying portion and a supporting portion, the supporting portion is integrally formed with the positioning body and one end of the carrying portion for enabling the carrying portion to resiliently oscillate with respective to the positioning body.

7. The casing structure as claimed in claim 5, wherein the supporting body has a wedged portion integrally formed with the supporting portion, when the supporting unit is installed on the base plate, the height of the wedged portion with respective to the second plane of the inner plate is greater than the height of the carrying portion with respective to the second plane of the inner plate.

8. An electronic device, comprising a casing structure and a power supply, the casing structure, comprising:
   an outer casing;

a base plate disposed in the outer casing, the base plate comprising:
- an inner plate having a first plane and a second plane, are arranged to oppositely face each other, wherein the first plane substantially and seamlessly abuts an inner surface of the outer casing;
- an outer plate arranged substantially perpendicular to the inner plate, wherein the outer plate has portions defining an opening thereon;
- an elastic arm projected in a sloped manner away from the inner plate and the outer casing, wherein one end of the elastic arm is angularly connected to the inner plate and the other end of the elastic arm is defined as a free end, the free end and a plane arranged on the inner plate are configured with a gap therebetween; and
- a fixing body connected to the inner plate and correspondingly arranged to the elastic arm; and a supporting unit including a substantially frame shaped positioning body and a contacting body, wherein the positioning body has a positioning portion and a connecting portion, the contacting body extends from the connecting portion of the positioning body;

wherein the second plane of the inner plate, the fixing body, and the free end of the elastic arm surroundingly define a restricting slot, and the external contour and the size of the positioning body correspondingly conforms to the restricting slot;

wherein the power supply is arranged in the outer casing and protrudingly disposed through the opening of the outer plate, the elastic arm and fixing body are arranged on a portion of the inner plate proximate to the orthographic projection of the power supply.

9. The electronic device as claimed in claim 8, wherein the cross-sectional area of the contacting body is substantially L-shaped, the contacting body has a contacting portion perpendicularly extended from the positioning body with a predetermined height and a restricting portion perpendicularly extended from the contacting portion, and the predetermined height is slightly larger than the gap between the free end and the inner plate to provide contact between the contacting body and the free end of the elastic arm.

10. The electronic device as claimed in claim 8, wherein the positioning portion of the positioning body is fixed between the fixing body and the second plane of the inner plate, and the contacting body abuts the free end of the elastic arm for retaining the relative positioning of the supporting unit and the base plate.

* * * * *